United States Patent [19]

Becker et al.

[11] 4,262,130
[45] Apr. 14, 1981

[54] PROCESS FOR THE PRODUCTION OF URETHANES

[75] Inventors: Robert Becker; Johann Grolig, both of Leverkusen; Christian Rasp, Cologne, all of Fed. Rep. of Germany

[73] Assignee: Bayer Aktiengesellschaft, Leverkusen, Fed. Rep. of Germany

[21] Appl. No.: 112,780

[22] Filed: Jan. 17, 1980

[30] Foreign Application Priority Data

Feb. 2, 1979 [DE] Fed. Rep. of Germany ....... 2903950

[51] Int. Cl.³ ................ C07C 125/065; C07C 125/073
[52] U.S. Cl. ....................................... 560/24; 252/438; 452/441; 549/69; 560/25; 560/27; 560/28; 560/30; 560/31; 560/32; 560/33; 560/115; 560/132; 560/157; 560/158; 560/9; 560/13
[58] Field of Search ................... 560/25, 24, 9, 13, 32, 560/33, 27, 28, 30, 31, 115, 132, 157, 158; 549/69

[56] References Cited

U.S. PATENT DOCUMENTS

| | | | |
|---|---|---|---|
| 3,467,694 | 9/1969 | Hardy et al. | 560/25 |
| 3,531,512 | 9/1970 | Hardy et al. | 560/25 |
| 3,763,217 | 10/1973 | Brill | 560/24 |
| 3,993,685 | 11/1976 | Zajacek et al. | 560/24 |
| 4,134,880 | 1/1979 | Miyata et al. | 560/25 |
| 4,178,455 | 12/1979 | Hirai et al. | 560/24 |
| 4,186,269 | 1/1980 | Hirai et al. | 560/25 |
| 4,219,661 | 8/1980 | Becker et al. | 560/24 |

FOREIGN PATENT DOCUMENTS

1087896 10/1967 United Kingdom .
1472243 5/1977 United Kingdom .

*Primary Examiner*—Natalie Trousof
*Assistant Examiner*—G. T. Breitenstein
*Attorney, Agent, or Firm*—Gene Harsh; Joseph C. Gil; Lyndanne M. Whalen

[57] ABSTRACT

The present invention relates to an improved process for the production of urethanes (carbamic acid esters) by the reaction of organic nitro compounds with carbon monoxide and organic compounds containing at least one hydroxy group in the presence of palladium and/or palladium compounds and a cocatalyst which consists of a mixture of one or more iron oxides and/or iron hydroxides and activating chloride-containing additives.

10 Claims, No Drawings

PROCESS FOR THE PRODUCTION OF URETHANES

BACKGROUND OF THE INVENTION

Organic isocyanates are generally produced on the commercial scale by reacting the corresponding amines with phosgene. Because of the toxicity of phosgene, attempts have been made for a long time to find a commercially practical method of synthesis for organic isocyanates, in which it is not necessary to use phosgene. One such method of synthesis involves the reaction of organic nitro compounds with carbon monoxide and organic hydroxyl compounds to form the corresponding urethanes, and the subsequent splitting of the urethanes formed into compounds containing isocyanate groups and compounds containing hydroxyl groups. In this type of process it is also possible to modify the urethane obtained as intermediate product, before splitting it up. Thus, it is possible, for example, to initially react the phenyl urethane obtainable from nitrobenzene, carbon monoxide and ethanol with formaldehyde to form the bisurethane of 4,4'-diisocyanato diphenylmethane and then to convert the intermediate product thus obtained into 4,4'-diisocyanato diphenyl-methane, with the elimination of the ethanol.

The splitting of urethanes into compounds containing the corresponding isocyanate groups and corresponding hydroxyl groups is described, for example, in German Offenlegungsschrift No. 2,421,503 and in the publications mentioned in that reference.

Essentially two types of catalysts for the production of the urethanes are described in the patent literature. The reaction of organic nitro compounds with carbon monoxide and alcohols to form urethanes in the presence of selenium or selenium compounds is described for example in German Offenlegungsschriften Nos. 2,343,826; 2,614,101 and 2,623,694. In these reactions, good urethane yields are obtained both with mono and with dinitro compounds. The selenium compounds, and in particular the organo selenium compounds formed as intermediate products during the reaction and hydrogen selenide, are extremely toxic and have to be removed quantitatively during the working up treatment, for example by means of a chemical reaction. This generally results in a complicated chemical working-up stage and means that the process is of doubtful economic viability. Noble metals, in particular palladium, in the presence of Lewis acids are described as catalysts in German Offenlegungsschriften Nos. 1,568,044 and 2,603,574. Anhydrous iron (III)-chloride is mentioned as a particularly effective Lewis acid. Although good urethane yields are obtained with these catalysts, relative to the amount of nitro compound used, the yields are unsatisfactory with respect to the amount of hydroxyl compound used. Thus, large proportions of diethyl ether are obtained because of the acidic properties of the Lewis acid, when ethanol is used as hydroxy component. Corrosion of the refined steel autoclaves used as reaction vessels is also observed when using these noble metal/Lewis acid catalysts. The corrosion can be limited to a considerable extent by adding organic bases such as, for example, pyridine, as described in German Offenlegungsschrift No. 2,603,574, but an unacceptably large amount of ether is still formed in the presence of these catalyst systems. A further disadvantage of these catalyst systems is their poor capacity for regeneration since the Lewis acids used are not sufficiently stable in the presence of the hydroxy compounds used.

It has now surprisingly been found that the reaction of organic nitro compounds with carbon monoxide and organic compounds containing at least one hydroxy group to form urethanes can be carried out in the liquid phase at elevated temperature and elevated pressure in the presence of palladium and/or palladium compounds and a cocatalyst consisting of mixtures of iron oxides and/or iron hydroxides and activating chloridecontaining additives.

DESCRIPTION OF THE INVENTION

The present invention therefore relates to a process for the production of urethanes comprising reacting organic nitro compounds with carbon monoxide and organic compounds containing at least one hydroxyl group in the liquid phase at elevated temperature and elevated pressure in the presence of (a) palladium and/or palladium compounds, (b) iron oxides and/or iron hydroxides, and (c) tertiary ammonium chlorides and/or compounds, containing chlorine which is anionically bound as chloride, of elements in the third to fifth main group or first to eighth secondary group of the periodic system of elements, but excluding iron oxychloride and palladium chlorides.

Suitable oxidic iron components (b) include, for example, oxides and hydroxides of divalent and trivalent iron in pure form or as mixtures. Suitable examples include iron (II)-oxide, iron (II)-hydroxide, iron (III)-hydroxide, $\alpha$-Fe$_2$O$_3$, $\gamma$-Fe$_2$O$_3$, Fe$_3$O$_4$, $\alpha$-FeO-OH, $\beta$-FeO-OH, $\gamma$-FeO-OH. The oxides and hydroxides of trivalent iron are particularly preferred. The oxidic iron component is used in concentrations of from 0.1 to 20% by weight, preferably 1 to 5% by weight, based on the reaction mixture including any solvent used.

Compounds, containing chlorine which is bound anionically as chloride, of elements in the third to fifth main group or in the first to eighth secondary group of the periodic system of the elements (excluding iron oxychloride and palladium chlorides) which can optionally also be present as complex salts and/or hydrochlorides of tertiary organic amines, are used as component (c) in the process according to the invention. Examples of suitable chlorides include AlCl$_3$; SnCl$_2$.2H$_2$O; SbCl$_3$; ZnCl$_2$; CeCl$_3$; TiOCl$_2$; VCl$_3$; CrCl$_3$; MnCl$_2$; FeCl$_2$.nH$_2$O, (n=0, 1, 2, 4, 6); $\alpha$-and $\beta$-Fe$_2$(OH)$_3$Cl; FeCl$_2$ . n pyridine (n=$\frac{2}{3}$, 1, 2, 4); FeCl$_2$ . n picoline (n=1,4) and other complex compounds.

Hydrochlorides of tertiary amines which are inert under the reaction conditions and have a molecular weight of from 59 to 10,000, preferably 59 to 300, are particularly suitable as hydrochlorides of tertiary amines. Hydrochlorides of aliphatic amines and of cycloaliphatic, aromatic, araliphatic or heterocyclic tertiary amines are suitable. Hydrochlorides of tertiary amines which have substituents which are inert under the reaction conditions such as for example, halogen, alkenyl, cyano, aldehyde, alkoxy, phenoxy, thioalkoxy, thiophenoxy, carbamyl, carboalkoxy and/or thiocarbamyl substituents are also suitable. Examples of suitable tertiary amines include trimethylamine, triethylamine, tripropylamine, tributylamine; cycloaliphatic tertiary amines such as N,N-dimethyl-cyclohexylamine; N,N-diethylcyclohexylamine and 1,4-diazobicyclo (2,2,2) octane; aromatic tertiary amines such as N,N-dimethylaniline and N,N-diethylaniline, as well as hereto aromatic tertiary amines such as pyridine, quinoline, isoquinoline, quinaldine, lepidine, pyrolyzed polyacrylonitrile and polyvinyl pyridine.

The preferred catalyst components (c) include iron (II)-chloride compounds of the type mentioned above by way of example and the tertiary ammonium chlorides mentioned by way of example, and in particular the hydrochloride of pyridine.

The catalyst components (c) are preferably added in concentrations of from 0.05 to 10% by weight in particular from 0.1 to 5% by weight, based on the reaction mixture including any solvent used. The pure compounds can be used, or mixtures of such compounds can also be used.

Palladium and/or palladium compounds of the type described below comprise an essential component. Metallic palladium may be added to the reaction mixture, since the metallic palladium is oxidized into palladium (II)-compounds by the chloride-activated iron oxide. It is also possible to use an inert carrier, for example an aluminum oxide carrier for the palladium. It is particularly advantageous to add palladium in the form of a compound which is soluble in the reaction mixture. Suitable compounds include, for example, palladium chloride; palladium bromide; palladium iodide, sodium tetrachloropalladate; potassium tetrachloropalladate; sodium tetrabromopalladate; sodium tetraiodopalladate; potassium tetraiodopalladate; palladium acetate; palladium acetyl acetonate and other soluble palladium compounds. Palladium chloride is a particularly preferred palladium salt. Palladium or palladium compounds are preferably added in concentrations, based on the reaction mixture including any solvent used, of from 0.0001 to 0.1% by weight, in particular from 0.0002 to 0.01% by weight, calculated as metallic palladium. The reaction rate is too slow at lower palladium concentrations. Although higher concentrations are feasible, they are uneconomical due to the possible losses of noble metal, and particularly since no further increase takes place in the urethane yields. One of the important advantages of the process according to the invention lies in the fact that it allows the production of urethanes in excellent yields, using only extremely small quantities of palladium compounds.

Bases, preferably tertiary amines, are used as additional catalyst components according to a particular embodiment of the process according to the invention. This use of tertiary amines increases the selectivity with respect to possible undesirable subsidiary reactions of the organic hydroxy compounds used as reactants.

Suitable organic bases include, in particular, amines, and in particular tertiary amines, which are inert under the reaction conditions and have molecular weights ranging from 59 to 10,000, preferably 59 to 300. Aliphatic and cycloaliphatic, aromatic, araliphatic or heterocyclic tertiary amines are suitable. Those tertiary amines which have substituents which are inert under the reaction conditions such as, for example, halogen, alkenyl, cyano, aldehyde, alkoxy, phenoxy, thioalkoxy, thiophenoxy, carbamyl, carboalkoxy and/or thiocarbamyl substituents are also suitable. Examples of suitable tertiary amines include trimethylamine; triethylamine, tripropylamine and tributylamine; cycloaliphatic tertiary amines such as N,N-dimethylcyclohexylamine, N,N-diethylcyclohexylamine and 1,4-diazobicyclo (2,2,2) octane; aromatic tertiary amines such as N,N-dimethylaniline and N,N-diethylaniline, and heteroaromatic tertiary amines such as pyridine, quinoline, isoquinoline, quinaldine, lepidine, pyrolyzed polyacrylonitrile and polyvinyl pyridine.

The tertiary amines can be added in concentrations of from 0.01 to 10% by weight, in particular 0.1 to 5% by weight, based on the reaction mixture including any solvent used concurrently.

The starting compounds for the process according to the invention include any organic nitro compounds, i.e. any organic compounds which contain nitro groups and are otherwise inert under the conditions of the process according to the invention, with at least one aliphatically, cycloaliphatically and/or aromatically bound nitro group, having a molecular weight preferably lying between 61 and 400, more preferably 123 and 262, and organic compounds containing at least one hydroxy group, for example substituted or unsubstituted aliphatic, cycloaliphatic and/or aromatic mono or polyhydroxy compounds, having a molecular weight preferably lying between 32 and 228, more preferably 32 and 102.

The following aromatic nitro compounds can be used by way of example: nitrobenzene; o-dinitrobenzene; m-dinitrobenzene; p-dinitrobenzene; o-chloronitrobenzene; m-chloronitrobenzene; o-chloronitrobenzene; o-nitrotoluene; m-nitrotoluene; p-nitrotoluene; 2,3-dinitrotoluene; 2,4-dinitrotoluene; 2,5-dinitrotoluene; 2,6-dinitrotoluene; 3,4-dinitrotoluene; 3-nitro-o-xylene; 4-nitro-o-xylene; 2-nitro-m-xylene; 4-nitro-m-xylene; 5-nitro-m-xylene; nitro-p-xylene; 3,4-dinitro-o-xylene; 3,5-dinitro-o-xylene; 3,6-dinitro-o-xylene; 4,5-dinitro-o-xylene; 2,4-dinitro-m-xylene; 2,5-dinitro-m-xylene; 4,5-dinitro-m-xylene; 4,6-dinitro-m-xylene; 2,3-dinitro-p-xylene; 2,3-dintro- p-xylene; 1-nitronaphthalene; 2-nitronaphthalene; dinitronaphthalenes; nitroanthracenes; nitrodiphenyls; bis-(nitrophenyl)-methanes; bis-(nitrophenyl)-thioethers; bis(nitrophenyl)-sulfones; nitrodiphenoxy alkanes and nitrophenothiazines.

Suitable cycloaliphatic nitrocompounds include: nitrocyclobutane; nitrocyclopentane; nitrocyclohexane; 1,2-dinitrocyclohexane; 1,3-dinitrocyclohexane; 1,4-dinitrocyclohexane and bis-(nitrocyclohexyl)-methanes.

Examples of the nitroalkanes group include: nitromethane, nitroethane; 1-nitropropane; 2-nitropropane; nitrobutanes; nitropentanes; nitrohexanes; nitrodecanes; nitrocetanes; 1,2-dinitroethanes; 1,2-dinitropropane; 1,3-dinitropropane; dinitrobutanes; dinitropentanes; dinitrohexanes; dinitrodecanes; phenylnitromethane; bis-(nitromethyl)-cyclohexanes; bis-(nitromethyl)-benzenes and ω-nitrocarboxylic acid nitriles.

Particularly preferred nitro compounds for the process according to the invention include aromatic nitro compounds such as, in particular, nitrobenzene, 1,3-dinitrobenzene, 2,4-dinitrotoluene, 2,6-dinitrotoluene; dinitronaphthalene such as, for example, 1,5-dinitronaphthalene, or 2,4'- or 4,4'-dinitrodiphenylmethane.

Monohydric alcohols, polyhydric alcohols, monohydric phenols and polyhydric phenols are among the organic compounds containing hydroxy groups which are suitable according to the invention.

The alcohols include linear or branched alkanols, cycloalkanols, alkenols, cycloalkenols, aralkyl alcohols and the like, each of which may be monohydric or polyhydric. These alcohols can contain a substituent which contains oxygen, nitrogen, sulfur or a halogen atom, for example a halogen, sulfoxide, sulfone, amine, amide, carbonyl or carboxylic acid ester group. The following monohydric alcohols are mentioned by way of example: methylalcohol, ethylalcohol, propanol, isopropanol, butanol, pentanol, hexanol, cyclohexanol, benzylalcohol. Suitable polyhydric alcohols include, for example: ethylene glycol, diethylene glycol, propylene glycol, dipropylene glycol, glycerin, hexanetriol and similar as well as higher functional polyols. Monohydric aliphatic alcohols with 1 to 6 carbon atoms are preferably used and ethyl alcohol is particularly preferably used.

Suitable phenols according to the invention include for example, phenol, cyclophenols, cresols, ethylphenols, propyl phenols, butyl phenols or higher alkyl phenols, pyrocatechol, resorcinol, 4,4'-dihydroxy diphenyl methane, bis-phenol-A, anthranol, phenanthrol, pyrogallol or phloroglucinol.

When carrying out the instant process the organic hydroxy compounds are generally used in sufficient quantities for there to be present an equivalent ratio of nitro groups to hydroxy groups of from 1:0.5 to 1:100, preferably 1:1 to 1:100 when using mono nitro compounds as starting material and an equivalent ratio between nitro groups and hydroxyl groups of 1:1 to 1:100 when using dinitro compounds.

The preferred alcohols are preferably used in an excess, in which case the unreacted excess acts as solvent.

The carbon monoxide is generally used in a quantity which corresponds to 1 to 30 mol carbon monoxide per mol of nitro groups to be reacted, the carbon monoxide generally being forced into the pressure reactor preferably used in the instant process.

The instant reaction can be carried out in the presence or in the absence of a solvent. The organic hydroxyl compound which is preferably used in excess generally serves as solvent. It is also possible to use inert solvents which can form up to 80% by weight of the total reaction mixture. The quantity of solvent must be calculated in such a way that the reaction heat of the exothermic formation of urethane can be discharged without an unacceptable increase in temperature, regardless of whether a hydroxyl compound is used in excess or whether an inert solvent is used. The instant process is therefore generally carried out using a concentration of nitro compounds of from 5 to 30% by weight, preferably 5 to 20% by weight, based on the total reaction mixture including the solvent.

Suitable solvents include solvents which are inert towards all of the reactants and the catalyst system such as, for example, aromatic, cycloaliphatic and aliphatic hydrocarbons which may be substituted by halogen such as benzene, toluene, xylene, chlorobenzene, dichlorobenzene trichlorobenzene, chloronaphthalene, cyclohexane, methylcyclohexane, chlorocyclohexane, methylene chloride, carbon tetrachloride, tetrachloroethane, trichloro-tri-fluoroethane and other compounds.

The reaction temperature is generally between about from 100° C. to 300° C., in particular between from 130° C. to 250° C. and particularly advantageously in the range of from 140° C. to 220° C. The pressure must be calculated in such a way that the pressure of a liquid phase is always ensured and it generally lies in the range of from 5 to 500 bar, particularly advantageously in the range of from 30 to 300 bar at the reaction temperature. The reaction time required for the quantitative conversion varies between a few minutes and several hours depending on the nitro compound or hydroxy compound used.

The reaction of the nitro compounds with the hydroxy compounds and carbon monoxide to form urethanes can be carried out batchwise or continuously.

The batchwise reaction can be carried out using small quantities of the homogeneously dissolved palladium salt, and adequate excess of iron oxide and/or iron hydroxide and a sufficient quantity of the activating additives mentioned by way of example. The iron oxides or iron hydroxides which are insoluble in the reaction medium are preferably added in the form of a fine powder and the activating additives are preferably added in the form of a alcoholic solution or suspension. The undissolved excess iron oxide compounds can be distributed, for example, by vigorous stirring or by pumping the reaction mixture around. The exothermic reaction heat can be discharged, for example by internally fitted cooling units or, in the case of pumping, by means of an external heat exchanger. The working up treatment and the recirculation of catalyst can be carried out in various ways depending on the solubility of the urethane produced in the reaction mixture. With readily soluble urethanes, it is possible, for example upon completion of the reaction, to separate the main quantity of the cocatalyst mixture which is sparingly soluble at low temperatures together with the majority of the absorbed palladium and the organic amine salt from the reaction product, for example by filtration or centrifuging and recirculate them into a new reaction mixture of nitro compounds, hydroxyl compounds, and carbon monoxide. The liquid reaction mixture can be separated in a conventional manner, for example by fractional distillation, into solvents, into the pure urethanes and optionally small quantities of by-products, this separation taking place either discontinuously or continuously. Small quantities of the cocatalyst component dissolved in the reaction mixture and/or traces of palladium compounds are often contained in the distillation residue and can be recirculated into the reaction vessel again.

The reaction mixture can be worked up in a modified way in the case of urethanes which are sparingly soluble in the solvent and excess hydroxy compound. For example, after release of pressure, the main quantity of catalyst is filtered off or centrifuged off under pressure and at an elevated temperature at which the urethanes are still dissolved, but the catalyst system comprising palladium and cocatalyst mixture substantially precipitates and the sparingly soluble urethane is then crystallized out by lowering the temperature, optionally together with small quantities of sparingly soluble by-products and residual catalyst. The mother liquor which contains small quantities of by-products, dissolved urethane and optionally dissolved cocatalyst components in addition to solvent or the excess organic hydroxy compound used as solvent can be recirculated directly or after prior removal of readily boiling by-product, for example by distillation, into the reaction of the nitro compounds with the hydroxy compounds and carbon monoxide, the quantity of nitro compound and hydroxy compound corresponding to the previous conversion being added. Higher boiling by-products which are not removed by crystallization can be removed continuously from the recirculation stream by distillative working up of an aliquot part of the mother liquor as distillation residue. The precipitated crude urethane can, for example, be crystallized by crystallization from a solvent which dissolves the urethane at high temperatures but which does not dissolve the by-products and the catalyst residues such as, for example, isooctane, benzene, toluene, xylene, chlorobenzene and dichlorobenzene. The residues which are insoluble at elevated temperature can be converted by oxidation into iron oxide and a waste gas resulting from the organic impurities, which consists essentially of carbon dioxide, oxygen, nitrogen and optionally readily volatile organic impurities. Depending on its composition, the waste gas can be discharged directly into the atmosphere or may be fed to a catalytic after-burning treatment in which residual impurities are removed by oxidation. The iron oxide obtained from the residue, which may still contain small quantities of palladium and/or palladium compound, is recirculated into the reaction of the nitro compounds with hydroxy compounds and carbon monoxide.

The continuous reaction can be carried out in a boiler cascade, a multiple tube reactor, several loop reactors connected in series, or in one or a number of adiabatic reaction tubes connected in series. The heat is discharged, for example, either internally through fitted cooling units, externally via a shell and tube heat exchanger or adiabatically via the thermal capacity of the reaction mixture with subsequent cooling in external cooling units.

The mixture can be worked up further, as described above, in which process both a continuous and a discontinuous mode of operation can be adopted.

When using the products of the process according to the invention, in the preferred manner, as intermediate products for the production of the corresponding isocyanates, it is often unnecessary to purify them. Instead, it may be sufficient for further processing to introduce the crude products produced after filtering the catalyst and optionally distilling off the solvent, into the subsequent processing treatment.

The following Examples serve to illustrate the process of the invention without restricting it in any way. In the Examples all quantities quoted represent parts by weight or percent by weight, unless otherwise indicated.

EXAMPLES

EXAMPLE 1

A solution of 50 g nitrobenzene in 200 g ethanol, together with 0.005 g palladium chloride (19 ppm), 10.0 g $\alpha$-$Fe_2O_3$ (3.8% by weight), 3.0 g $FeCl_2.4\ H_2O$ (1.1% by weight) and 2.5 g pyridine (0.9% by weight), was introduced into a 0.7 l stainless steel autoclave and carbon monoxide was introduced into the mixture at room temperature and a pressure of 120 bar. The contents of the autoclave were heated to 180° C., in which process a maximum pressure of 145 bar was reacted, and were left at this temperature for 2 hours. The pressure was then reduced to 100 bar. The mixture was then cooled to room temperature, the pressure of the reaction gas released by means of a cooling trap, and the liquid contents of the autoclave analyzed by gas chromatography together with the liquid deposited in the cooling trap. The nitrobenzene conversion was 100%. The selectivity of phenyl urethane (ethyl-N-phenyl carbamic acid ester), based on the nitro benzene, was also 100%.

EXAMPLE 2

The process described in Example 1 was repeated but 2.6% by weight of $\alpha$-$Fe_2O_3$ and 4.2% by weight of pyridinium chloride were used as catalyst. Pyridine itself was not added. The nitrobenzene conversion was also 100% in this case. The selectivity of phenylurethane based on nitrobenzene, was 95%.

EXAMPLE 3

The process described in Example 1 was repeated but 7.0% by weight, based on total mixture, of 2,4-dinitrotoluene (DNT) was introduced instead of nitrobenzene. The DNT conversion was 100%. The selectivity of bis-urethane was 96% based on DNT. The effective reaction time was only 40 minutes.

EXAMPLE 4

The process described in Example 1 was repeated but 1.2% by weight of $FeCl_2.4\ H_2O$ only was used instead of iron oxide.

The nitrobenzene conversion was only 25% (with the same selectivity).

This experiment shows that it is necessary to add oxidic iron.

EXAMPLE 5

The process described in Example 1 was repeated using 3.8% by weight of $\alpha$-$Fe_2O_3$, instead of $FeCl_2.4\ H_2O$.

The nitrobenzene conversion was only 1%.

This experiment shows that it is necessary to activate the $\alpha$-$Fe_2O_3$ with a chloride addition (for example in the form of $FeCl_2.4\ H_2O$ or pyridinium chloride).

What is claimed is:

1. A process for the production of urethanes comprising reacting organic nitro compounds with carbon monoxide and organic compounds containing at least one hydroxy group in the liquid phase at elevated temperature and elevated pressure in the presence of
    (a) palladium and/or palladium compounds,
    (b) iron oxides and/or iron hydroxides, and
    (c) tertiary ammonium chlorides and/or compounds of elements in the third to fifth main group or first to eighth subsidiary group of the periodic system of the elements containing chlorine which is anionically bound as chloride but excluding iron oxychloride and palladium chlorides.

2. A process according to claim 1, characterized in that oxides and/or hydroxides of trivalent iron are used as component (b).

3. A process according to claim 1 or 2, characterized in that iron (II)-chloride and/or iron (II)-chloride complexes are used as component (c).

4. A process according to claim 1 or 2, characterized in that hydrochlorides of tertiary amines are used as component (c).

5. A process according to claim 4, characterized in that pyridine hydrochloride is used as hydrochloride of a tertiary amine.

6. A process according to claim 1, characterized in that tertiary amines are used as an additional catalyst component.

7. A process according to claim 1, characterized in that nitrobenzene or dinitrotoluene is used as nitro compound.

8. A process according to claim 1, characterized in that a monohydric aliphatic alcohol with 1 to 6 carbon atoms is used as organic compound containing at least one hydroxy group.

9. A process according to claim 1, characterized in that the reaction is carried out at a temperature of from 130° C. to 250° C.

10. A process according to claim 9, characterized in that the reaction is carried out at a pressure of from 5 to 500 bar.

* * * * *